United States Patent [19]

Buttle

[11] Patent Number: 5,461,661
[45] Date of Patent: Oct. 24, 1995

[54] LINE DISCONNECTION DETECTION CIRCUIT FOR ECHO-CANCELLING TRANSCEIVERS

[75] Inventor: Kenneth G. Buttle, Orangevale, Calif.

[73] Assignee: Level One Communications, Inc., Sacramento, Calif.

[21] Appl. No.: 281,770

[22] Filed: Jul. 28, 1994

[51] Int. Cl.⁶ .......................... H04M 1/24; H04M 3/00; H04M 1/00
[52] U.S. Cl. .................. 379/3; 379/406; 379/410; 379/411; 379/345
[58] Field of Search ............... 379/3, 406, 410, 379/411, 345; 370/32.1

[56] References Cited

U.S. PATENT DOCUMENTS

| | | | |
|---|---|---|---|
| 4,564,934 | 1/1986 | Macci | 370/32.1 |
| 4,896,318 | 1/1990 | Kokubo et al. | 379/410 |
| 5,014,263 | 5/1991 | Vairavan | 379/411 |
| 5,062,102 | 10/1991 | Taguchi | 370/32.1 |
| 5,157,653 | 10/1992 | Genter | 379/410 |
| 5,237,495 | 7/1994 | Shenoi | 379/406 |
| 5,283,784 | 2/1994 | Genter | 370/32.1 |
| 5,315,585 | 5/1994 | Iizuka | 379/406 |
| 5,319,636 | 6/1994 | Long | 370/32.1 |

Primary Examiner—Stephen Chin
Assistant Examiner—Vijay Shankar
Attorney, Agent, or Firm—Merchant, Gould, Smith, Edell, Welter & Schmidt

[57] ABSTRACT

A circuit for comparing transmitted and received data frames containing appropriate stuff symbols to detect when a channel is disconnected. Transmit data symbols consisting of frames of user data, each with a constant number of symbols, are separated by a sequence of symbols known as the frame pattern. At the end of each data frame, just before the next frame pattern, a small number of stuff symbols are added into the frame. The stuff symbols injected in the transmit signal are chosen to be identical to the last scrambled data symbol in the frame of user data. Stuff symbols in a recovered receive signal are chosen to look identical to data symbols which were scrambled at the remote transceiver. A frame-by-frame comparison between the transmit stuff symbols and the next received stuff symbols is carried out on a continual basis. When the two sets of symbols are equal in each frame for a number of consecutive frames N, then the circuit indicates that only the transmit signal is being received and channel disconnection is detected.

20 Claims, 5 Drawing Sheets

5,461,661

LINE DISCONNECTION DETECTION CIRCUIT FOR ECHO-CANCELLING TRANSCEIVERS

BACKGROUND OF THE INVENTION

1. Field of the Invention

This invention relates in general to a line disconnection detection circuit, and more particularly, to a circuit for comparing transmitted and received data frames containing stuffed symbols to detect when a channel is disconnected.

2. Description of Related Art

Transceivers typically use a hybrid circuit (or balancing circuit, or two-to-four wire converter) to provide first-order cancellation of the transmit signal before the combined receive and transmit signal enters the receiver. Hybrid circuits generally use a simple model of the characteristic impedance of the communication channel in the frequency band of data transmission to create an estimate of the transmit signal component of the channel signal. This estimate is then subtracted from the channel signal to isolate the received signal. The hybrid circuit allows gain to be applied to the signal prior to further processing so that any noise added by the signal processing is negligible with respect to the receive signal level. Further signal processing may involve the step of removing any residual transmit signal component from the channel signal (echo cancellation).

Nevertheless, a problem occurs when an echo cancelling transceiver is passing data in both directions on a communications channel, and that channel is suddenly disrupted. For example, channel disruption may occur when the telephone line is unplugged at the transceiver. Disruption of the hybrid circuit balance results when the channel is disrupted. Accordingly, not only is the transmission link broken and the receive signal eliminated, but a full-sized transmit signal which exceeds the allowable signal voltage range enters the receiver.

Due to the strength of the transmit signal which permeates into the receiver channel, echo cancellers are incapable of cancelling the entire signal. Thus, the uncancelled portion of the transmit signal continues on through the receiver and is decoded as valid data. Accordingly, unless there is some identifier in the data streams to distinguish receive data from transmit data, a channel disconnection will not be detected.

It can seen then that there is a need for a line disconnection detection circuit. Further, there is a need for a line disconnection circuit which can distinguish between the local transmit signal and the remote receive signal.

SUMMARY OF THE INVENTION

To overcome the limitations in the prior art described above, and to overcome other limitations that will become apparent upon reading and understanding the present specification, the present invention discloses a circuit and method for detecting when a channel is disconnected from a transceiver. The present invention thus applies to full duplex operation of a data transceiver on a communication channel where both the transmit and receive signals are continually coexistent.

Transmit data symbols consist of "frames" of user data, each with a constant number of symbols, separated by a sequence of symbols known as the "frame pattern". At the end of each data frame, just before the next frame pattern, a small number of "stuff symbols" may be added into the frame. The frame pattern symbols are pre-defined values and the data symbols are determined by the user input data. However, the stuff symbols are undefined, and may be any value. These stuff symbols allow the frame period to be varied on a frame-by-frame basis.

The present invention solves the above-described problems by providing a circuit for comparing transmitted and received data frames containing appropriate stuff symbols to detect when a channel is disconnected. If the stuff symbols injected in the transmit signal are chosen to be the last scrambled data symbol in the frame of user data, repeated for each stuff symbol, then the stuff symbols will look identical to the last data symbol which was scrambled by POLY-A. Further, stuff symbols in a recovered receive signal will look identical to the last data symbol which was scrambled by POLY-B at the remote transceiver. A frame-by-frame comparison between the transmit stuff symbols and the next received stuff symbols is carried out on a continual basis. If the two sets of stuff symbols are equal in each frame for a number of consecutive frames N, then it may be determined that the transmit signal is being received, and channel disconnection has occurred. Appropriate transceiver tear-down actions may be taken at this time.

A system in accordance with the principles of the present invention comprises a comparing means for receiving a transmit symbol sequence containing a first series of stuff symbols associated with and identifying the local transceiver and a receive symbol sequence containing a second series of stuff symbols received over a telephone line. The second series of stuff symbols are associated with a remote transceiver. The comparing means determines whether the transmitted stuff symbols are the same as the receive stuff symbols. The system further includes a first signal means, coupled to the comparing means, for indicating whether the transmit stuff symbols and the receive stuff symbols are the same; counter means, coupled to the signal means, for counting the number of times the transmit stuff symbols and the receive stuff symbols are the same; reset means, coupled to the counter means, for resetting the counter in response to the transmit stuff symbols and the receive stuff symbols not being the same; and line disconnect signal means, coupled to the counter, for generating a signal representing the disconnection of the telephone line in response to the receipt of a predetermined number of sequential first signals indicating that the transmit stuff symbols and the receive stuff symbols are the same.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a circuit for comparing transmitted and received data frames containing stuffed symbols to detect when a channel is disconnected.

Figure 1:
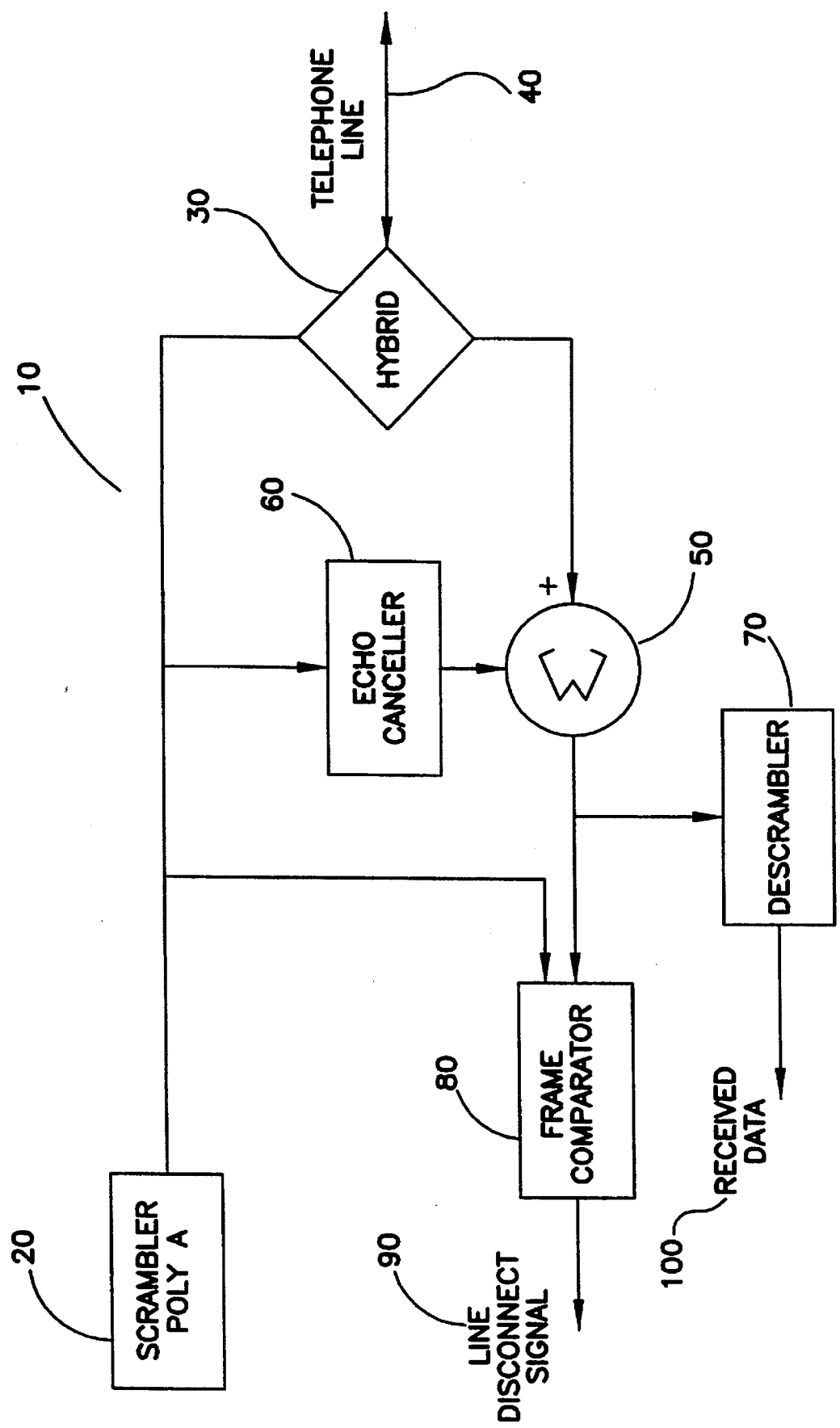
FIG. 1 is a general block diagram of the line disconnection detection circuit.

FIG. 1 illustrates an exemplary line disconnect detection circuit 10 according to the present invention. The data which is to be transmitted is first scrambled according to a first polynomial (POLY-A) 20. After scrambling the data, stuff symbols may be inserted into the symbol frame. The transmitted symbol frame is then forwarded to hybrid 30 which is coupled to telephone line 40. Line disconnect detection circuit 10 also receives data signals over telephone line 40. The received signals are routed to hybrid 30 and onto the summing node 50. As well as being transmitted over telephone line 40, the transmit symbol frame is also passed through echo canceller 60 where it is then subtracted from the signal output of hybrid 30 which enters the summing mode 50. The output of summing node 50 is then descrambled according to polynomial (POLY-B) 70 resulting in the received data 100. The output of POLY-A 20 and the output of summing node 50 act as inputs to the frame comparator 80. Frame comparator 80 compares the stuff symbols of the transmit and the receive frames to detect whether the telephone line has been disconnected.

Figure 2:
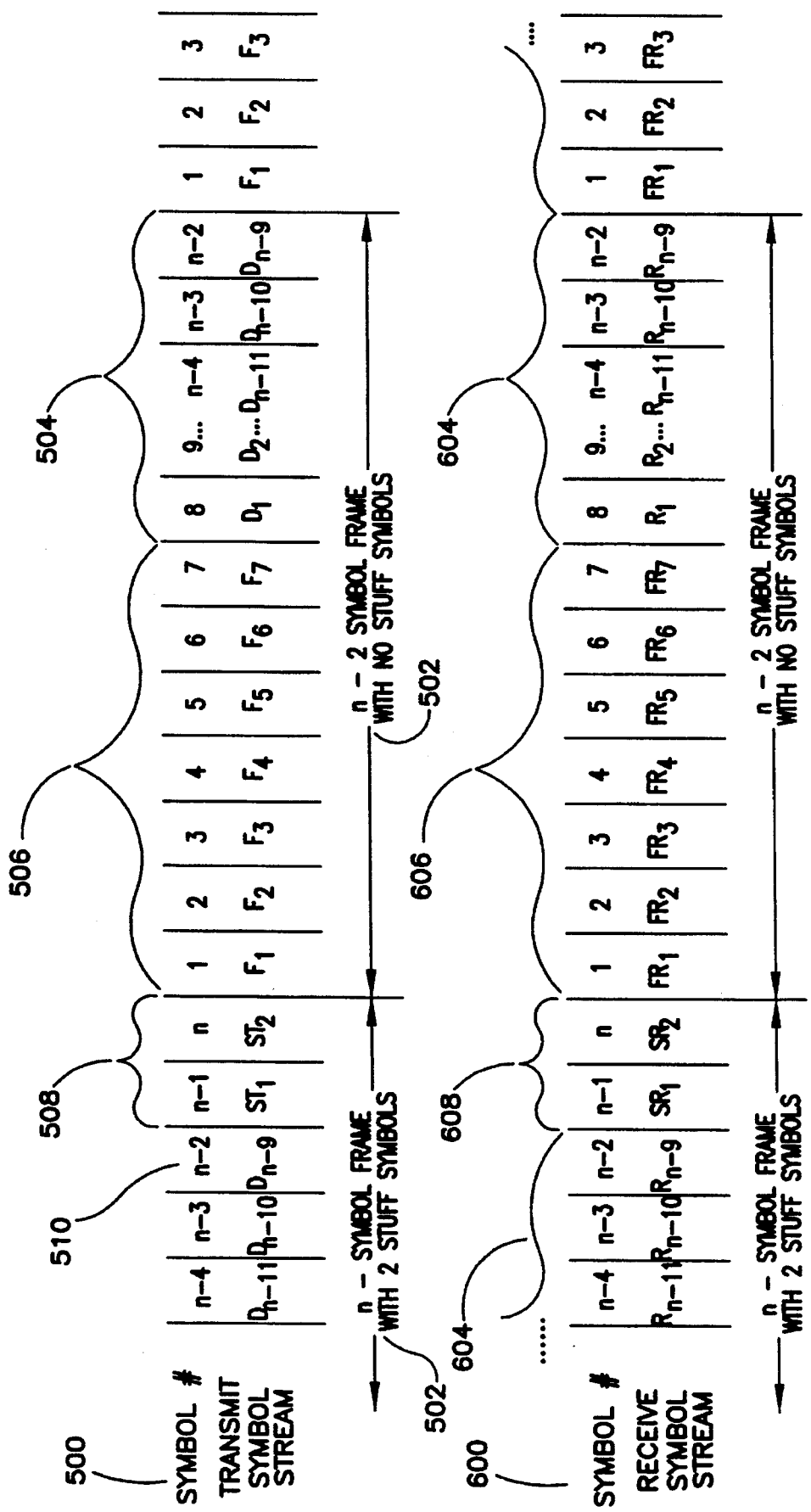
FIG. 2 illustrates the frame structure of the transmit and receive symbol streams for the line disconnection detection circuit.

FIG. 2 illustrates the transmit symbol stream 500 and receive symbol stream 600. Transmit data symbols consist of frames of user data 502. Each frame contains a constant number of data symbols. Further, each train of data symbols are separated by a sequence of symbols known as the frame pattern 506. At the end of each data frame, just before the next frame pattern, a small number of stuff symbols 508 may be added into the frame 502. Thus, the frame period varies according to whether stuff symbols 508 have been added. The data symbols 504 are determined by the user input data and the frame pattern symbols 506 are predefined values. However, the stuff symbols 508 are undefined and may be any value. If the stuff symbols 508 injected in the transmit signal are chosen to be the same as the last scrambled data symbol 510 in the frame of user data, then the stuff symbols 508 will be identical to the last data symbol 510 scrambled by POLY-A.

This pattern or scheme is repeated for the receive symbol stream 600. Received stuff symbols 608 may be inserted between the receive data symbols 604 and the receive frame pattern 606.

Thus, when a frame-by-frame comparison between the transmit 500 and received symbol stream 600 is performed, the stuff symbols of the transmit symbol stream 508 is compared against the received symbol stream 608 emitted from the summing node. If the two sets of stuff symbols 508, 608 are equal for a number of consecutive frames, the comparator 80 determines that only the transmit signal is being received and a channel disconnection has been indicated.

Figure 3:
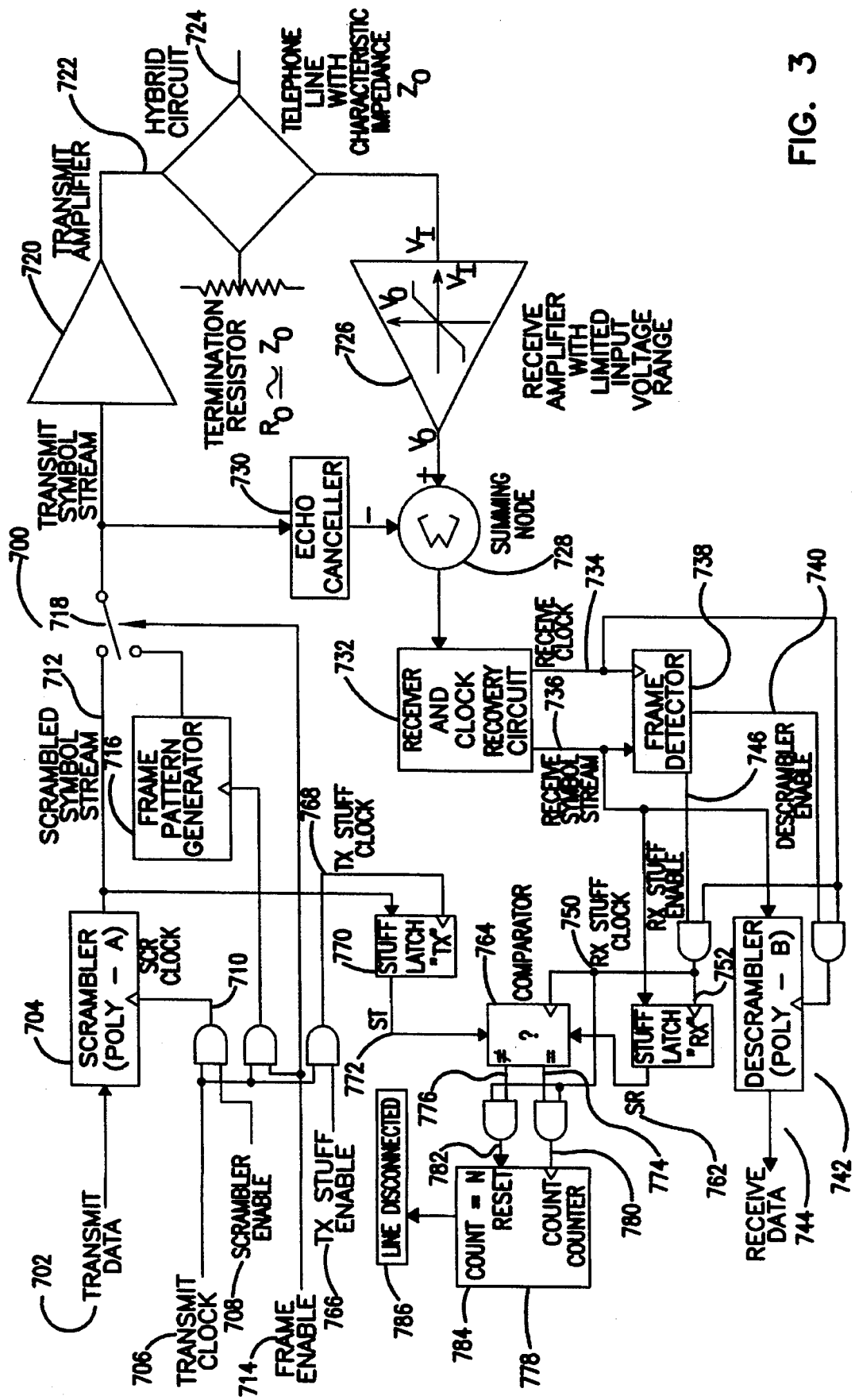
FIG. 3 is a more detailed block diagram of the line disconnection detection circuit of FIG. 1.

FIG. 3 illustrates a more detailed block diagram of the line disconnection detector for an echo cancelling transceiver 700. Transmit signal 702 is sent to the scrambler POLY-A 704. Transmit clock 706 and scrambler enable 708 are combined to generate the scrambler clock 710. The scrambler output 712 consists of the scrambled data symbols with any stuff symbols. Frame enable 714 is combined with the transmit clock 706 to generate control signal for frame pattern generator 716. Switch 718 is controlled by the frame enable signal 714 in order to generate the transmit symbol stream. The transmit symbol stream is routed through amplifier 720 and then to hybrid circuit 722. The transmit signal then is routed over telephone line 724.

The receive symbol stream is received by hybrid circuit 722 from telephone line 724. The receive symbol stream is routed to the receive amplifier 726 and then to summing node 728. The transmit symbol stream is tapped to provide a sample of the scrambler 704 output 712 for echo canceller 730 so that the transmit symbol stream may be cancelled from the receive symbol stream entering the positive tap of summing node 728. The maximum voltage level of the signal out of amplifier 720 is large enough so that the absence of telephone line 724 creates a signal out of hybrid circuit 722 having a maximum voltage level in excess of the maximum input voltage level limit of receive amplifier 726. When this situation occurs, echo canceller 730 is incapable of eliminating all significant energy in the transmit signal component of the receive signal at the output of receive amplifier 726.

The output of the summing node 728 is routed to the receiver and clock recovery circuit 732. The receive clock 734 and receive symbol stream 736 are then routed to the frame detector 738. The receive clock 734 and the descrambler enable signal from the frame 740 from frame detector 738 are combined to clock descrambler POLY-B 742. The output of descrambler 742 is the receive data 744. Frame detector 738 also generates the receive stuff enable 746 which is combined with the receive clock 734 to generate the receive stuff clock 750. Receive stuff clock 750 and receive symbol stream 736 act as inputs to the receive stuff latch 752. The receive stuff symbols 762 are thus isolated by the receive stuff latch 752 which are then routed to comparator 764. Transmit stuff enable 766 and transmit clock 706 are combined to generate the transmit stuff clock 768. Transmit stuff clock 768 is combined with the scrambler 704 output 712 in the transmit stuff latch 770 to isolate the transmit stuff symbols 772. The transmit stuff symbols 772 are also routed to comparator 764. Receive stuff symbols 762 and transmit stuff symbols 772 are analyzed and compared by the comparator 764. If they are not equal then signal 776 is generated and combined with the receive stuff clock 750 to generate a reset signal 782 for counter 778. If the symbols are equal then comparator 764 generates a signal 774 which is combined with the receive stuff clock 750 to generate a count signal 780 which is sent to counter 778. Once the counter counts N 784 consecutive count signals 780, a line disconnected signal 786 is generated.

Figure 4A:
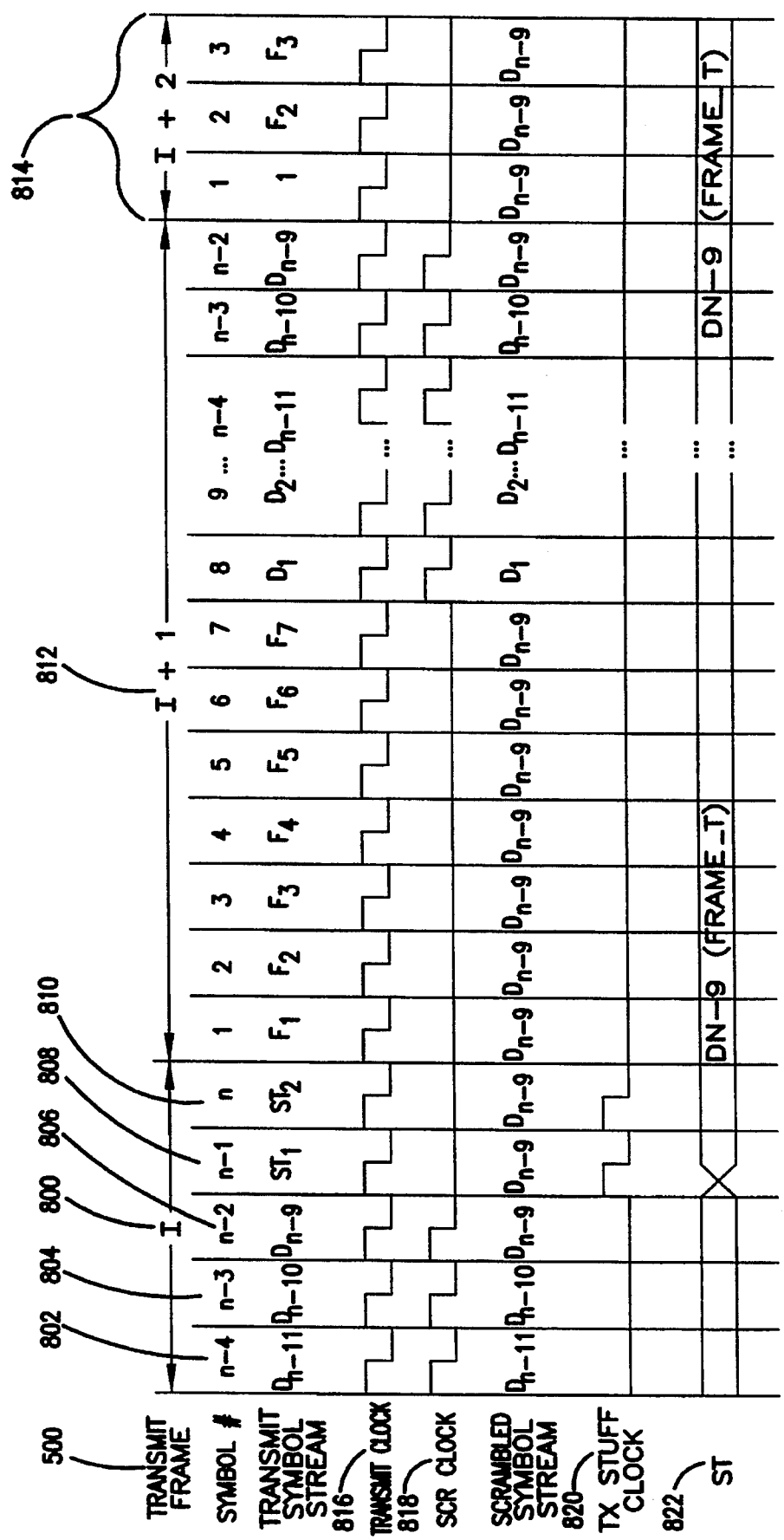
FIG. 4 is a timing diagram for the line disconnection detection circuit.
Figure 4B:
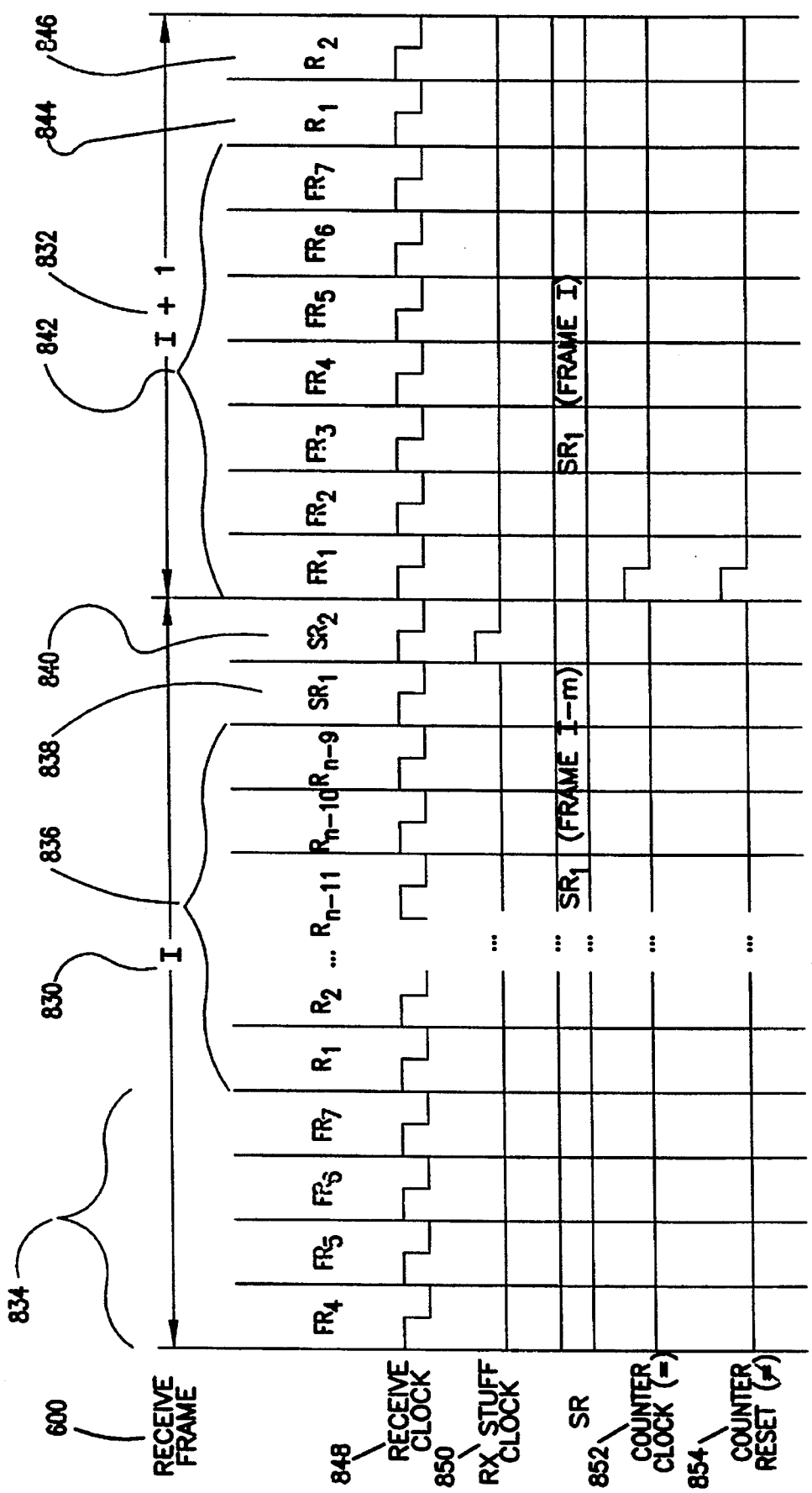

FIG. 4 illustrates the timing diagram for the line disconnection detector. FIG. 4 illustrates both transmit frame 500 and receive frame 600. The transmit frame is divided into frame symbols. The $I_{th}$ transmit frame 800 is shown having transmit symbols $D_{n-11}$ 802, $D_{n-10}$ 804, and $D_{n-9}$ 806. The $I_{th}$ transmit frame also contains two stuff symbols, $ST_1$ 808 and $ST_2$ 810. The $I_{th}+1$ transmit frame 812 does not have any stuff symbols. With regard to transmit frame $I_{th}+2$, only the initial frame pattern symbols 814 are shown. Each symbol is clocked by the transmit clock 816 and the scrambler clock 818 is triggered only for each data symbol. The symbol stream for the $I_{th}$ transmit frame consist of $D_{n-11}$ 802, $D_{n-10}$ 804, $D_{n-9}$ 806, and two additional symbols representing the stuff symbols 808, 810, which are the same as the last data symbol 806. The transmit stuff clock 820 is shown to be synchronous with the stuff symbols $ST_1$ 808 and $ST_2$ 810. Finally, the representation for the transmit symbols are illustrated 822.

For the receive frame 600, only the $I_{th}$ 830 and $I_{th}+1$ 832 receive frames are illustrated in FIG. 4. With regard to the $I_{th}$ receive frame 830 only the 4th–7th data frames 834 are illustrated. Then the receive data symbols $R_1, R_2 \ldots R_{n-9}$ 836 are shown. The $I_{th}$ receive frame 830 also shows two receive stuff symbols, $SR_1$ 838 and $SR_2$ 840. The $I_{th}+1$ receive frame illustrates only the seven frame pattern symbols 842 and two receive data symbols, $R_1$ 844 and $R_2$ 846. The receive clock is shown synchronous with each frame pattern symbol 834, data symbol 836, and receive stuff symbol 838, 840. The receive stuff clock 850 is shown synchronous with the second receive stuff symbol, $SR_2$ 840. Counter clock (=) 852 and counter clock (not =) 854 are also shown. The number of Counter Clocks (=) counts can thereby be determined. If a preset number of consecutive counter clocks (=) are detected (without the counter be reset by receiving a counter clock (not =)), a line disconnected signal is generated.

The comparison function performed by the line disconnection detector may be expressed mathematically according to the equations below:

$$\sum_{i=1}^{N} \frac{ST_1 \cdot SR_1 (i_{th}\, n\ \text{symbol frame})}{[ST_1 (i_{th}\, n\ \text{symbol frame})]^2} = 1, \text{for disconnection}$$

$$\sum_{i=1}^{N} \frac{ST_1 \cdot SR_1 (i_{th}\, n\ \text{symbol frame})}{[ST_1 (i_{th}\, n\ \text{symbol frame})]^2} < 1, \text{if connected}$$

If the receive symbol stream is not equal to the transmit symbol stream from the same transceiver with delay D, then the detector assumes that the telephone line is connected. However, if the receive symbol stream is equal to the transmit symbol stream from the same transceiver with delay D, the detector assumes that the line is disconnected. A counter keeps a running total of the number of times that the receive stuff symbols and the transmit stuff symbols are the same. The counter is reset whenever the comparator determines that the receive stuff symbols and the transmit stuff symbols are different. Only when a predetermined value, N, is reached by the counter does the circuit indicate that the channel has been disconnected.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A line disconnection detector apparatus for comparing a transmit symbol sequence of a local transceiver to a received symbol sequence of a remote transceiver, the transmit symbol sequence containing a first series of stuff symbols associated with and identifying the local transceiver and the receive symbol sequence containing a second series of stuff symbols associated with and identifying the remote transceiver, the line disconnection detector apparatus comprising:

comparing means for receiving a transmit symbol sequence containing a first series of stuff symbols associated with and identifying the local transceiver and a receive symbol sequence containing a second series of stuff symbols received over a communication channel and associated with and identifying a remote transceiver and for determining whether the transmitted stuff symbols are the same as the receive stuff symbols;

first signal means, coupled to the comparing means, for generating a signal indicating that the transmit stuff symbols and the receive stuff symbols are not the same;

second signal means, coupled to the comparing means, for generating a signal indicating that the transmit stuff symbols and the receive stuff symbols are the same;

counter means, coupled to the first and second signal means, for counting the number of times the signal from the second signal means is received;

reset means, coupled to the counter means, for resetting the counter means in response to receiving the signal from the first signal means; and line disconnect signal means, coupled to the counter, for generating a signal representing the disconnection of the communication channel in response to the receipt of a predetermined number of sequential signals from the second signal means.

2. The line disconnection apparatus of claim 1, further comprising:

receive stuff clock means, coupled to the comparing means, for generating a receive stuff clock associated with the receive stuff symbols in response to a receive stuff enable signal and a receive clock;

receive stuff latch means, coupled to the comparing means, for providing to the comparator the receive stuff symbols in response to the receive symbol sequence and the receive stuff clock;

transmit stuff clock means, coupled to the comparing means, for generating a transmit stuff clock associated with the transmit stuff symbols in response to a transmit stuff enable signal and a transmit clock; and transmit stuff latch means, coupled to the comparing means, for providing to the comparator the transmit stuff symbols in response to the transmit symbol sequence and the transmit stuff clock.

3. The line disconnection apparatus of claim 2, further comprising:

means, coupled to the communication channel, for eliminating the transmit symbol sequence from the receive symbol sequence, the eliminating means having a maximum allowable instantaneous input voltage;

means, coupled to the eliminating means, for deriving the receive clock from the receive symbol sequence;

frame detector means, coupled to the receive clock deriving means, for generating a descrambler enable signal and a receive stuff enable signal; and receive data means, coupled to the frame detector means, for generating the receive data in response to the receive symbol sequence, the descrambler enable signal and the receive clock.

4. The line disconnection apparatus of claim 3 wherein the transmit symbol sequence has instantaneous voltage levels less than the maximum input voltage level allowed for the eliminating means.

5. The line disconnection apparatus of claim 3 further comprising:

means, coupled to the communication channel, for transferring a transmit signal to the communication channel;

means, coupled to the communication channel, for transferring a receive signal from the communications channel to the eliminating means;

means, coupled to the transmit signal transferring means, for producing a transmit symbol sequence having instantaneous voltage levels that exceed the maximum input voltage level allowed for the eliminating means in the absence of the receive signal being received over the communication channel.

6. The line disconnection apparatus of claim 1, wherein the transmit symbol sequence comprises:

data symbols;

frame pattern symbols; and stuff symbols;

the data symbols being scrambled according to a first scramble polynomial; and the stuff symbols being the same as the last data symbol.

7. The line disconnection apparatus of claim 1, wherein the receive symbol sequence comprises:

receive data symbols;

receive frame pattern symbols; and receive stuff symbols;

the receive data symbols being scrambled according to a second scramble polynomial; and the receive stuff symbols being the same as the last transmit data symbol.

8. A line disconnection detector apparatus for comparing a transmit symbol sequence of a local transceiver to a received symbol sequence of a remote transceiver, the transmit symbol sequence containing a first series of stuff symbols associated with and identifying the local transceiver and the receive symbol sequence containing a second series of stuff symbols associated with and identifying the remote transceiver, the line disconnection detector apparatus comprising:

comparing means for receiving a transmit symbol sequence containing a first series of stuff symbols associated with and identifying the local transceiver and a receive symbol sequence containing a second series of stuff symbols received over a communication channel and associated with and identifying a remote transceiver and for determining whether the transmitted stuff symbols are the same as the receive stuff symbols;

first signal means, coupled to the comparing means, for generating a signal indicating that the transmit stuff symbols and the receive stuff symbols are not the same;

second signal means, coupled to the comparing means, for generating a signal indicating that the transmit stuff symbols and the receive stuff symbols are the same;

counter means, coupled to the first and second signal means, for counting the number of times the signal from the second signal means is received;

reset means, coupled to the counter means, for resetting the counter means in response to receiving the signal from the first signal means;

line disconnect signal means, coupled to the counter, for generating a signal representing the disconnection of the communication channel in response to the receipt of a predetermined number of sequential signals from the second signal means;

receive stuff clock means, coupled to the comparing means, for generating a receive stuff clock associated with the receive stuff symbols in response to a receive stuff enable signal and a receive clock;

receive stuff latch means, coupled to the comparing means, for providing to the comparator the receive stuff symbols in response to the receive symbol sequence and the receive stuff clock;

transmit stuff clock means, coupled to the comparing means, for generating a transmit stuff clock associated with the transmit stuff symbols in response to a transmit stuff enable signal and a transmit clock;

transmit stuff latch means, coupled to the comparing means, for providing to the comparator the transmit stuff symbols in response to the transmit symbol sequence and the transmit stuff clock;

means, coupled to the communication channel, for eliminating the transmit symbol sequence from the receive symbol sequence, the eliminating means having a maximum allowable instantaneous input voltage;

means, coupled to the eliminating means, for deriving the receive clock from the receive symbol sequence;

frame detector means, coupled to the receive clock deriving means, for generating a descrambler enable signal and a receive stuff enable signal; and receive data means, coupled to the frame detector means, for generating the receive data in response to the receive symbol sequence, the descrambler enable signal and the receive clock.

9. The line disconnection apparatus of claim 8 wherein the transmit symbol sequence has instantaneous voltage levels less than the maximum input voltage level allowed for the eliminating means.

10. The line disconnection apparatus of claim 8 further comprising:

means, coupled to the communication channel, for transferring a transmit signal to the communication channel;

means, coupled to the communication channel, for transferring a receive signal from the communications channel to the eliminating means;

means, coupled to the transmit signal transferring means, for producing a transmit symbol sequence having instantaneous voltage levels that exceed the maximum input voltage level allowed for the eliminating means in the absence of the receive signal being received over the communication channel.

11. The line disconnection apparatus of claim 8, wherein the transmit symbol sequence comprises:

data symbols;

frame pattern symbols; and stuff symbols;

the data symbols being scrambled according to a first scramble polynomial; and the stuff symbols being the same as the last data symbol.

12. The line disconnection apparatus of claim 8, wherein the receive symbol sequence comprises: receive data symbols;

receive frame pattern symbols; and receive stuff symbols;

the receive data symbols being scrambled according to a second scramble polynomial; and the receive stuff symbols being the same as the last transmit data symbol.

13. A detector apparatus for identifying when a communication line has been disconnected comprising:

means for generating a transmit symbol sequence to be transmitted over the communication line, the transmit symbol sequence being associated with and identifying a local transceiver;

means for generating a receive symbol sequence to be received over the communication line, the receive symbol sequence being associated with and identifying a remote transceiver;

means, coupled to the communication channel and the receive symbol sequence generating means, for eliminating the transmit symbol sequence from the receive symbol sequence, the eliminating means having a maximum allowable instantaneous input voltage;

comparing means, coupled to the means for generating the transmit signal and the means for generating the receive signal, for receiving the transmit symbol sequence containing a first series of stuff symbols associated with and identifying the local transceiver and the receive symbol sequence containing a second series of stuff symbols received over a communication channel associated with and identifying the remote transceiver and for determining whether the transmitted stuff symbols are the same as the receive stuff symbols;

first signal means, coupled to the comparing means, for generating a signal indicating that the transmit stuff symbols and the receive stuff symbols are not the same;

second signal means, coupled to the comparing means, for generating a signal indicating that the transmit stuff symbols and the receive stuff symbols are the same;

counter means, coupled to the first and second signal means, for counting the number of times the signal from the second signal means is received;

reset means, coupled to the counter means, for resetting the counter means in response to receiving the signal from the first signal means; and line disconnect signal means, coupled to the counter, for generating a signal representing the disconnection of the communication channel in response to the receipt of a predetermined number of sequential signals from the second signal means.

14. The line disconnection apparatus of claim 13, wherein the transmit symbol sequence comprises:
   data symbols;
   frame pattern symbols; and
   stuff symbols;
   the data symbols being scrambled according to a first scramble polynomial; and
   the stuff symbols being the same as the last data symbol.

15. The line disconnection apparatus of claim 13, wherein the receive symbol sequence comprises:
   receive data symbols;
   receive frame pattern symbols; and
   receive stuff symbols;
   the receive data symbols being scrambled according to a second scramble polynomial; and
   the receive stuff symbols being the same as the last transmit data symbol of the remote transceiver.

16. The line disconnection apparatus of claim 13, further comprising:
   receive stuff clock means, coupled to the comparing means, for generating a receive stuff clock associated with the receive stuff symbols in response to a receive stuff enable signal and a receive clock;
   receive stuff latch means, coupled to the comparing means, for providing to the comparator the receive stuff symbols in response to the receive symbol sequence and the receive stuff clock;
   transmit stuff clock means, coupled to the comparing means, for generating a transmit stuff clock associated with the transmit stuff symbols in response to a transmit stuff enable signal and a transmit clock; and
   transmit stuff latch means, coupled to the comparing means, for providing to the comparator the transmit stuff symbols in response to the transmit symbol sequence and the transmit stuff clock.

17. The line disconnection apparatus of claim 16, further comprising:
   means, coupled to the eliminating means, for deriving the receive clock from the receive symbol sequence;
   frame detector means, coupled to the receive clock deriving means, for generating a descrambler enable signal and a receive stuff enable signal; and
   receive data means, coupled to the frame detector means, for generating the receive data in response to the receive symbol sequence, the descrambler enable signal and the receive clock.

18. The line disconnection apparatus of claim 17 wherein the transmit symbol sequence has instantaneous voltage levels less than the maximum input voltage level allowed for the eliminating means.

19. The line disconnection apparatus of claim 13 further comprising:
   means, coupled to the communication channel, for transferring the transmit signal sequence to the communication channel;
   means, coupled to the communication channel, for transferring the receive signal sequence from the communications channel to the eliminating means;
   means, coupled to the communication channel, for eliminating the transmit symbol sequence from the receive symbol sequence;
   means, coupled to the eliminating means, for producing a transmit symbol sequence having instantaneous voltage levels that exceed the maximum input voltage level allowed for the eliminating means in the absence of the receive signal being received over the communication channel.

20. A method for detecting the disconnection of a receive channel, the method comprising the steps of:
   receiving a transmit symbol sequence containing a first series of stuff symbols associated with and identifying a local transceiver and a receive symbol sequence containing a second series of stuff symbols received over a communication channel associated with and identifying a remote transceiver;
   comparing the transmit symbol sequence to the received symbol sequence of the transceiver;
   determining whether the transmitted stuff symbols are the same as the receive stuff symbols;
   generating a first signal indicating that the transmit stuff symbols and the receive stuff symbols are not the same;
   generating a second signal indicating that the transmit stuff symbols and the receive stuff symbols are the same;
   counting the number of times the first signal is received;
   resetting a counter in response to receiving the second signal; and
   generating a signal representing the disconnection of the communication channel in response to the receipt of a predetermined number of sequential second signals indicating that the transmit stuff symbols and the receive stuff symbols are the same.

* * * * *